(12) United States Patent
Hashida et al.

(10) Patent No.: US 6,783,130 B2
(45) Date of Patent: Aug. 31, 2004

(54) SEAL MECHANISM AND FUEL PUMP PROVIDED THEREWITH

(75) Inventors: Minoru Hashida, Hitachinaka (JP); Hideki Machimura, Tokai (JP); Hideaki Yamauchi, Hitachinaka (JP); Masayoshi Kotaki, Hitachinaka (JP); Takefumi Yamamura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/942,120

(22) Filed: Aug. 30, 2001

(65) Prior Publication Data

US 2003/0006564 A1 Jan. 9, 2003

(30) Foreign Application Priority Data

Jul. 6, 2001 (JP) ........................................ 2001-205538

(51) Int. Cl.[7] .............................................. F16J 15/32
(52) U.S. Cl. ..................... 277/551; 277/552; 277/572
(58) Field of Search ................................ 277/551, 552, 277/560, 562, 566, 572, 575, 573

(56) References Cited

U.S. PATENT DOCUMENTS

| | | | | |
|---|---|---|---|---|
| 3,963,014 A | * | 6/1976 | Staudt et al. ................ 277/591 |
| 4,060,023 A | * | 11/1977 | Vegella ........................ 277/346 |
| 4,327,924 A | * | 5/1982 | Wheeler ....................... 277/551 |
| 4,504,067 A | * | 3/1985 | Cather, Jr. .................... 277/569 |
| 4,560,718 A | * | 12/1985 | Ritchey ..................... 123/41.72 |
| 4,623,153 A | * | 11/1986 | Nagasawa .................... 277/551 |
| 4,660,839 A | * | 4/1987 | Mitumaru .................... 277/572 |
| 4,789,166 A | * | 12/1988 | Rericha et al. ............. 277/554 |
| 5,009,435 A | * | 4/1991 | Villanyi et al. .............. 277/552 |
| 5,198,053 A | * | 3/1993 | Duncan ..................... 156/272.4 |
| 5,431,415 A | * | 7/1995 | Millonig et al. ............ 277/353 |
| 5,509,670 A | * | 4/1996 | Wheeler ....................... 277/565 |
| 5,562,182 A | * | 10/1996 | Kayukawa et al. ......... 184/6.17 |
| 5,595,697 A | * | 1/1997 | Wada et al. .................. 264/135 |
| 5,642,889 A | * | 7/1997 | Pauler et al. ................ 277/552 |
| 6,047,970 A | * | 4/2000 | Friend et al. .................. 347/65 |
| 6,092,637 A | * | 7/2000 | Otto et al. .............. 192/85 CA |
| 6,209,882 B1 | * | 4/2001 | Riess .......................... 277/562 |
| 6,345,825 B1 | * | 2/2002 | Guth et al. .................. 277/317 |
| 6,367,811 B1 | * | 4/2002 | Hosokawa et al. ......... 277/560 |

FOREIGN PATENT DOCUMENTS

JP 10141508 5/1998

* cited by examiner

Primary Examiner—William L. Miller
(74) Attorney, Agent, or Firm—Crowell & Moring LLP

(57) ABSTRACT

A seal mechanism with improved pressure tightness is provided to eliminate a return piping to a fuel tank used for reducing pressure applied to the seal mechanism in a high pressure fuel pump. The seal mechanism includes a stress reduction mechanism for reducing the stress generated at the junction between its retaining member and flexible member.

18 Claims, 7 Drawing Sheets

$(\phi D - \phi d)/2$ (mm)

SEAL MECHANISM AND FUEL PUMP PROVIDED THEREWITH

BACKGROUND OF THE INVENTION

1. Field of the Invention

The present invention relates to an oil seal for sealing out a sealing fluid such as oil and fuel. It relates, for example, to an oil seal for a reciprocating shaft which uses two-part fluid, and in particular to an oil seal used in a high pressure pump for an in-cylinder direct injection device of an automobile gasoline engine.

2. Description of the Related Art

High pressure pumps for in-cylinder injection devices use a conventional oil seal as shown in Japanese patent application No. 2000-097826. This requires return piping to the fuel tank to avoid fuel pressure on the oil seal, considering the pressure proof of the oil seal.

Also, oil seals that take conventional pressure proof into consideration need a backup ring between a retaining member and flexible member as described, for example, in JP-A-10-141508.

The related art described above needs pressure-reducing return piping to the fuel tank to avoid fuel pressure on the oil seal. This presents problems such as increases in the number of parts, increased costs, and increased man-hours for pipe routing.

If an oil seal is used under high pressure without pressure-reducing return piping to the fuel tank such as the one described above, it needs a backup ring or the like. This makes the oil seal structure complex. Furthermore, since high pressure acts only on one side, a load is applied to the entire seal member, causing the retaining member to move.

SUMMARY OF THE INVENTION

In the light of the above problems with the related art, it is an object of the present invention to improve the durability of oil seals under high pressure. Another object thereof is to simplify the entire system in which a fuel pump is used.

To attain the above objects, according to the present invention, the shapes of the retaining member and flexible member has been changed from the conventional ones. Alternatively, the flexible member is prevented from swelling due to the sealed fluid either by using a swell-resistant material for the flexible member or by applying surface treatment to the flexible member. Besides, according to the present invention, a low-friction material is used for the sealing surface of the retaining member or the mating surface, or it subjects the flexible member or the mating member to friction-reducing surface treatment to reduce the frictional forces of the sealing surface or the mating surface therewith. Furthermore, according to the present invention, a constraint is provided on the periphery of the seal member to prevent the seal member from moving under pressure.

DETAILED DESCRIPTION OF THE PREFERRED EMBODIMENTS

Preferred embodiments of the present invention will be described below with reference to the drawings. The oil seals according to the embodiments are used, for example, in a high pressure fuel pump for an automobile in-cylinder injection gasoline engine.

Figure 6:
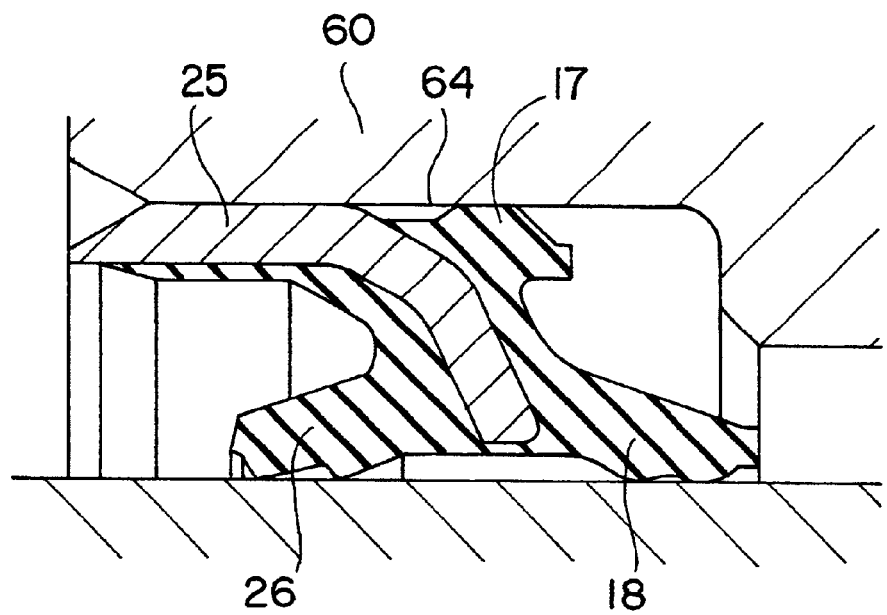
FIG. 6 is a partial sectional view of the oil seal according to a fourth embodiment of the present invention.
Figure 7:
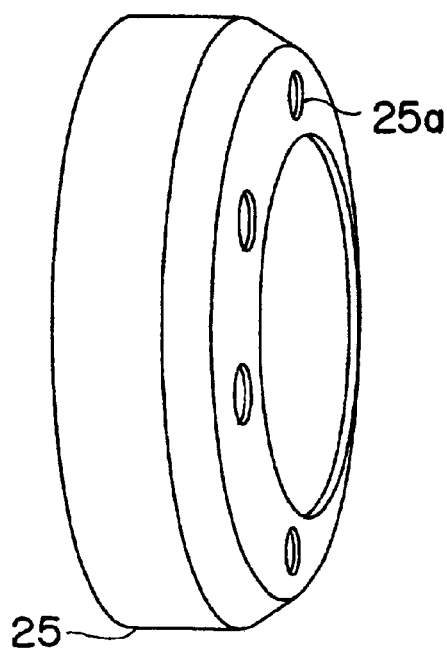
FIG. 7 is a supplemental perspective view of the fourth embodiment.
Figure 8:
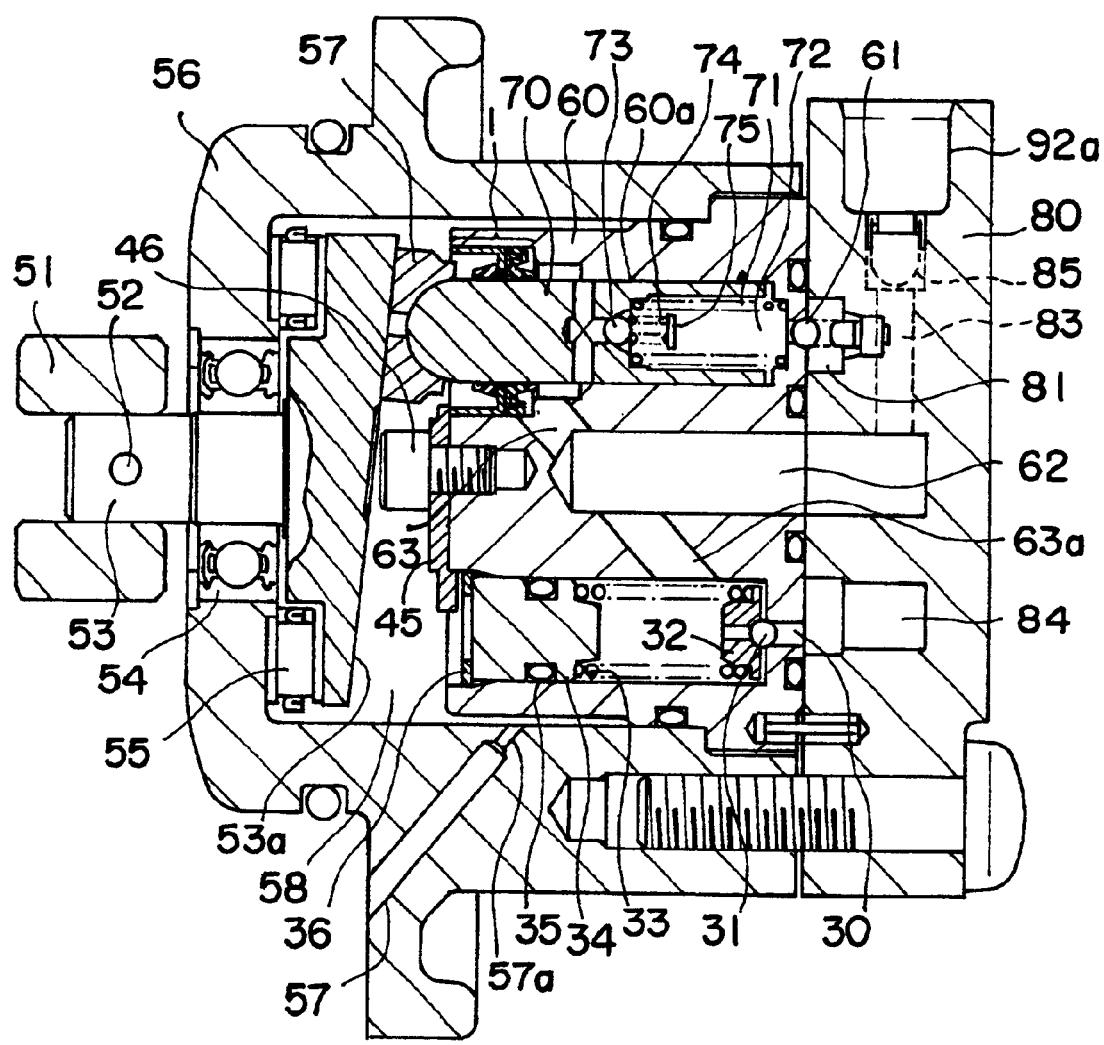
FIG. 8 is a sectional structural view of a high pressure fuel pump.
Figure 9:
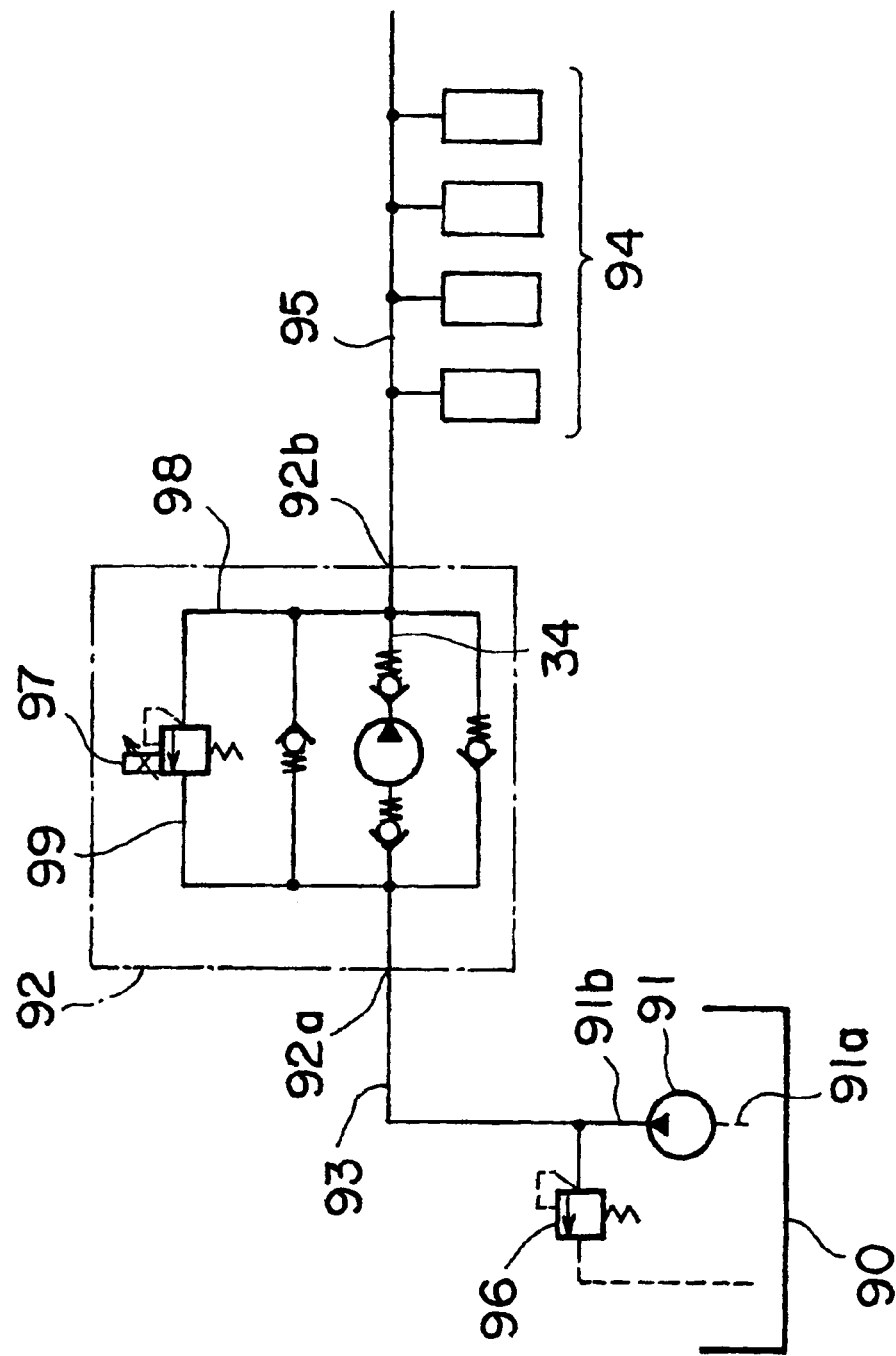
FIG. 9 is a diagram showing a fuel system of an in-cylinder injection engine.
Figure 10:
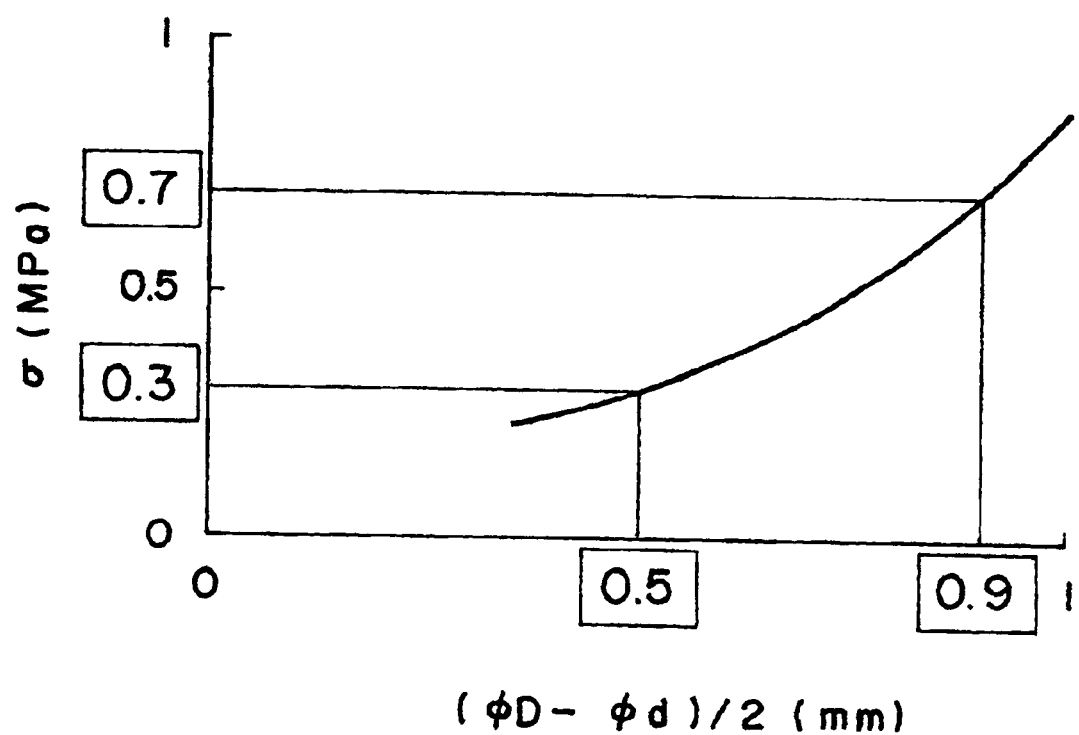
FIG. 10 is a graph showing the stress generated in flexible members of oil seals.

FIGS. 1 to 7 show the oil seals according to the embodiments of the present invention, FIG. 8 is a structural view of the high pressure fuel pump, FIG. 9 shows a fuel system of the in-cylinder injection gasoline engine, and FIG. 10 shows the stress acting on the flexible members of oil seals.

First, the fuel system of the in-cylinder injection engine will be described with reference to FIG. 9. A fuel tank 90 is connected to an inlet 91a of a low pressure pump 91. A discharge opening 91b of the low pressure pump 91 is connected to an inlet 92a of a high pressure pump 92 via low pressure piping 93. A discharge opening 92b of the high pressure pump 92 is connected to a fuel injection valve 94 via high pressure piping 95.

The operation of the fuel system will be described now. The fuel supplied under pressure from the fuel tank 90 by the low pressure pump 91 has its pressure regulated to 0.2 to 0.7 MPa by a low-pressure regulator 96 and is fed to the high pressure pump 92. The fuel pressurized by the high pressure pump 92 has its pressure regulated to a required fuel pressure of 3 to 12 MPa by a pressure-regulating valve 97 and is fed to the fuel injection valve 94 via high pressure piping 95. To simplify the fuel system, there is neither a passage for connecting the high pressure pump 92 with the downstream side of the low-pressure regulator 96 nor a passage (return piping) for connecting the high pressure pump 92 with the fuel tank 90.

Now the structure and operation of a high pressure fuel pump employing an oil seal of the present invention will be described with reference to FIG. 8. A coupling 51 which transmits the driving force from an engine cam shaft to a shaft 53 is transmitted to the shaft 53 via a pin 52 fitted in the coupling 51. The shaft 53 is rotatably supported by a body 56 via a radial bearing 54 and thrust bearing 55. The shaft 53 is provided with a swash plate 53a which has a plane at an angle to the axis of the shaft 53 and which oscillates along with the rotation of the shaft 53.

A cylinder 60 is fixed in the body 56. A plunger 70 is supported, in such a way that it is free to reciprocate, by a plurality of cylinder bores 60a arranged in the radial direction of the cylinder 60. It reciprocates against a slipper 57 equipped with a ball joint mechanism as a guide member, along with the expansion and contraction of a plunger spring 71 installed between the plunger 70 and cylinder 60 when the swash plate 53a oscillates.

The volume enclosed by the plunger 70 and cylinder 60 forms a pumping chamber 72. When the plunger 70 reciprocates, fuel is drawn, compressed, and discharged through an inlet valve installed in the plunger 70 and an discharge valve installed in the cylinder 60. Specifically, the fuel supplied at 0.2 to 0.7 MPa from the low pressure pump 91 is pressurized to 3 to 12 MPa to be discharged through the pumping chamber 72. The inlet valve is formed by a ball 73, spring 74, and spring stopper 75 which supports the spring 74. The spring stopper 75 is fastened by press-fitting one end of the plunger spring 71 inside the plunger 70. To make it possible to supply fuel to the pumping chamber 72, an intake space 62 and a transverse hole 63 in communication with the plunger 70 are provided in the central portion of the cylinder 60.

To prevent excessive pressurization, a safety valve is provided in the cylinder 60. The safety valve consists of a passage 30 in communication with a discharge chamber 81; a ball 31; a spring 33; a ball holder 32 for holding the ball and spring; a stopper 34 for supporting the reaction force of the spring acting on the ball; and a ring 36 for fastening the stopper. The stopper 34 is provided with an O-ring 35 for sealing out fuel. The space downstream of the ball 31 is in communication with the intake space 62 via a passage 63a. If the discharge chamber 81 is pressurized excessively, the force acting on the ball 31 overcomes the spring force to open the valve, resulting in depressurization.

An aluminum die-cast rear body 80 is used to introduce fuel into the intake space 62. Aluminum die-casting is used because of light weight in addition to excellent workability and productivity. The rear body 80 is equipped with an intake passage 83 leading fuel from an intake port 92a to the intake space 62, a discharge passage 84 leading fuel from the discharge valve to a discharge port 92b through the discharge chamber 81, a passage 98 for leading fuel to the pressure-regulating valve 97 for regulating the pressure of the fuel to be discharged, and a return passage 99 for returning fuel from the pressure-regulating valve 97 to the intake passage 83. The intake passage 83 in the rear body 80 is provided with a filter 85 to remove foreign matter larger than a particular size from the incoming fuel.

A drive is a collection of parts (hereinafter the slipper, the swash plate, and bearings will be referred to collectively as the drive) that rotatably support loads. The life of the bearings can be prolonged if lubricated with oil. The engine lubricant is used to lubricate the drive. An oil feed channel 57 is formed in the body 56 to introduce the lubricant. The engine lubricant flows into an oil chamber 58 formed between the body 56 and the cylinder 60. A throttle 57a is provided in the oil feed channel 57 to regulate oil supply from the engine. The inside diameter of the throttle 57a is determined in such a way as to prevent clogging caused by foreign matter from the engine.

The oil seal 1 is disposed between the plunger 70 and cylinder 60 to separate the oil 40 in the oil chamber 58 from the fuel 41 in the cylinder 60.

A retainer plate 45 is provided as a redundant means of preventing the oil seal 1 from shifting toward the swash plate 53a or falling out. It is fastened to the cylinder 60 with a screw 46. A single retainer plate will do even for a pump which has two or more plungers. Instead of using a screw, the retainer plate may be fastened by a snap ring if a grooved protrusion is provided on the cylinder 60, or the snap ring itself may be used as the retainer plate. Incidentally, the retainer plate 45 may be used in place of the ring 36 which constitutes a part of the safety valve and fastens the stopper 34.

Figure 1:
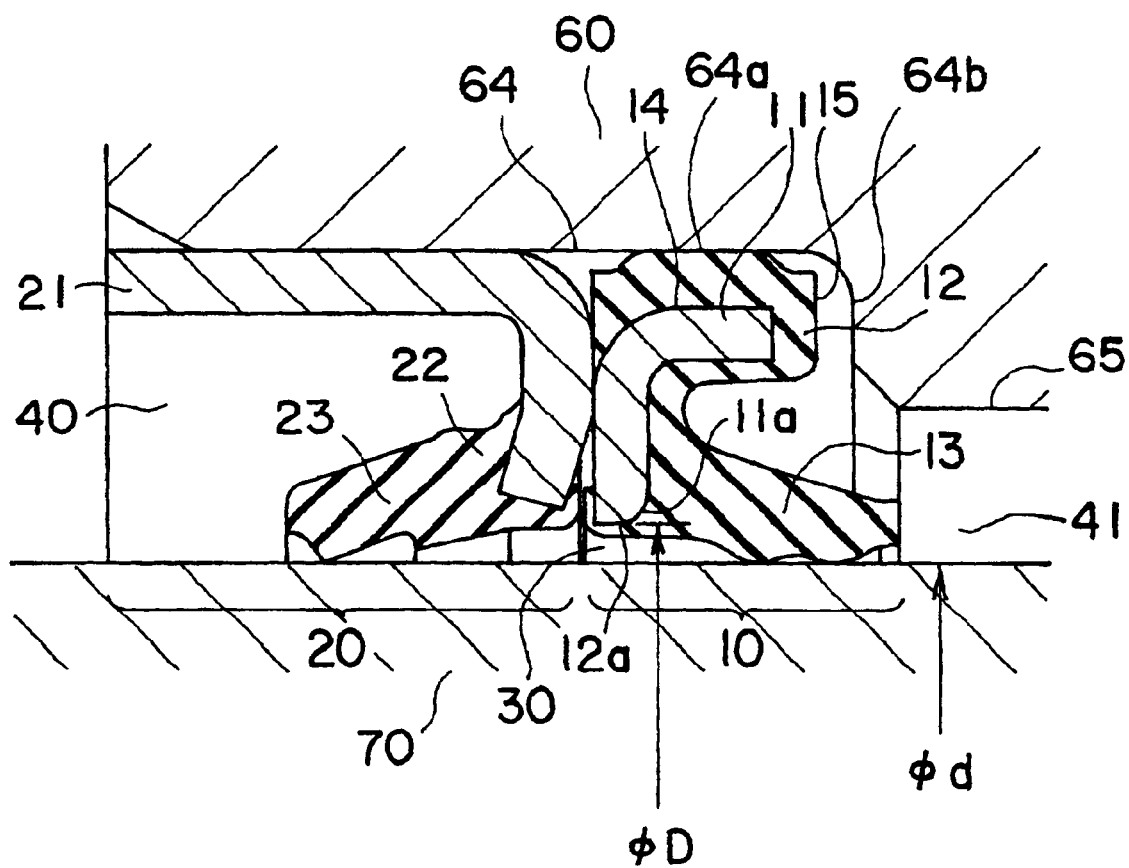
FIG. 1 is a partial sectional view of the oil seal according to a first embodiment of the present invention.

The oil seal according to a specific embodiment of the present invention will be described below with reference to FIG. 1. The oil seal 1 consists of a first oil seal 10 for sealing out incoming fuel and a second oil seal 20 for sealing out oil.

The first oil seal 10 consists of an annular first retaining member 11 L-shaped in cross-section, and a first flexible member 12 molded in one piece with the first retaining member 11. It is inserted in a cylinder fitting hole 64 and secured by the radial tightening force between the cylinder fitting hole 64 and first oil seal 10. The radial interference is 0.1 to 0.4 mm. The first oil seal 10 has a first lip 13, which is the first flexible member, in the direction of the inside diameter from the first retaining member 11. The first lip 13 is configured to slide freely along the plunger 70 and seals out the fuel 41, which is the sealed fluid. The first flexible member is formed also all around the outer side 14 of the retaining member 11 and forms a seal between the first oil seal 10 and cylinder 60 by coming into close contact with the inner surface 64a of the cylinder fitting hole.

Figure 2:
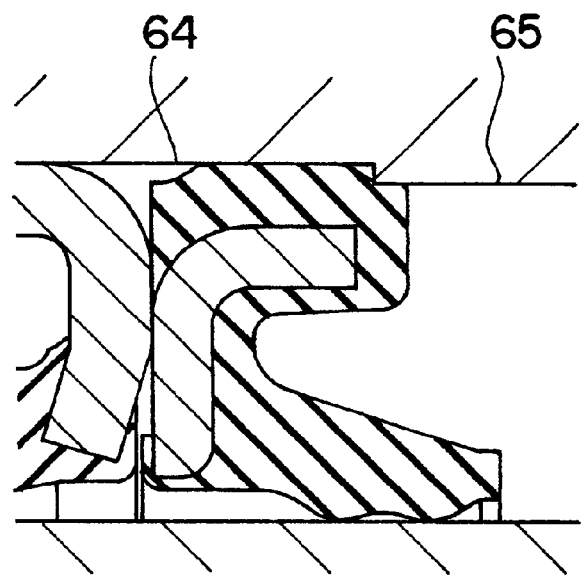
FIG. 2 is a supplemental partial sectional view of the first embodiment.
Figure 3:
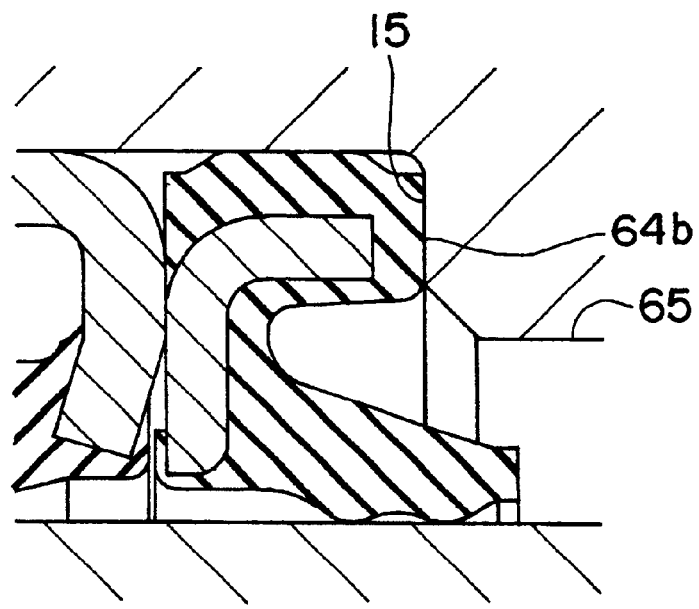
FIG. 3 is a supplemental partial sectional view of the first embodiment.

The cylinder fitting hole 64 is provided with a small diameter portion 65 forming an end face 64b of the cylinder fitting hole to prevent the first oil seal 10 from shifting in the axial direction. A gap is provided between the end face 15 of the first flexible member and the end face 64b of the cylinder fitting hole to prevent excessive external force from being applied to the first flexible member even if the first flexible member 12 swells due to the fuel, which is the sealed liquid. Alternatively, the small diameter portion 65 of the cylinder fitting hole may be made relatively large as shown in FIG. 2 to avoid axial shift and prevent excessive external force even in case of the swelling described above. If the swelling of the flexible member has negligible effect as shown in FIG. 3, the gap described above may be omitted. In that case, fuel can be sealed out by bringing the small diameter portion 65 of the cylinder fitting hole into close contact with the end face 15 of the first flexible member, which may be formed in the first oil seal 10 rather than on the periphery of the first oil seal. If the axial shift is negligible, there is no need to provide the small diameter portion 65 of the cylinder fitting hole.

Figure 4:
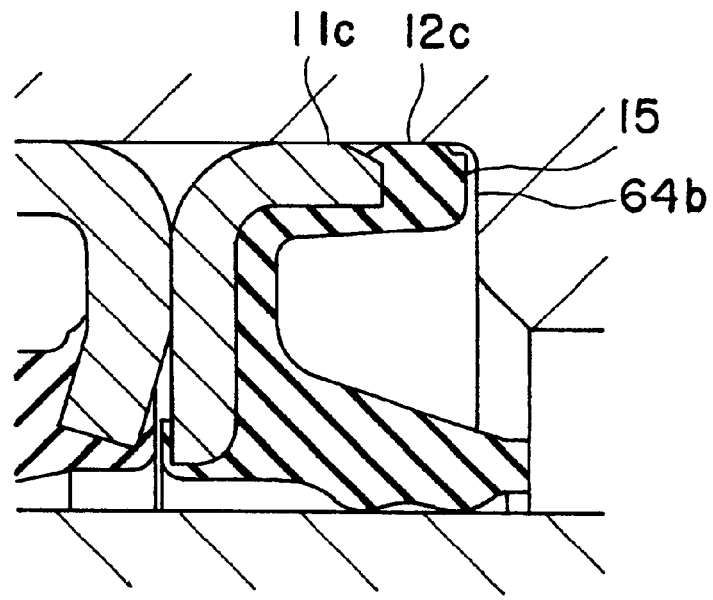
FIG. 4 is a partial sectional view of the oil seal according to a second embodiment of the present invention.

Besides, the outermost portion of the first oil seal may consist of a retaining member 11c and flexible member 12c as shown in FIG. 4 to fasten the first oil seal itself firmly. Combining this idea with the idea shown in FIG. 3, it is also possible to construct the outermost portion using a retaining member and form the outer fuel seal by the end face 15 of the first flexible member and a cylinder fitting hole 64b.

The second oil seal 20 consists of an annular second retaining member 21 L-shaped in cross-section, and a second flexible member 22 molded in one piece with the second retaining member 21. It is inserted in the cylinder fitting hole 64 in close contact with the first oil seal 10 and is secured by the radial tightening force between the cylinder fitting hole 64 and second retaining member 21 of the second oil seal 20. The radial interference is 0.05 to 0.2 mm. The second oil seal 20 has a second lip 23, which is the second flexible member, in the direction of the inside diameter from the second retaining member 21. The second lip 23 is configured to slide freely along the plunger 70 and seals out engine oil 40, which is the sealed fluid. The outermost portion, which is the second retaining member 21, is fastened firmly by being inserted in the cylinder 60 directly. This configuration makes the first and second oil seals less prone to shift or come off even if a large pressure is applied to the first oil seal 10 by the sealed fluid, i.e., the fuel, exerting a large axial force in the direction of the second oil seal.

The oil seal is constructed such that the passage 30 between the first lip 13 and second lip 23 is filled with grease insoluble in the fuel—for example, fluorine-based grease—to facilitate the initial fit between the plunger 70 and oil seal or improve wear resistance. Besides, fluorine-based rubber, which has a wide operating temperature range and can be used even in the fuel, is used for the first and second lips. If the first and second lips do not wear excessively, there is no need to fill in the grease.

During the operation of the high pressure fuel pump, the first lip 13 of the first oil seal 10 deforms under the pressure of the sealed fluid, i.e., the fuel 41, generating excessive stress in the flexible member near an inside corner 11a of the first retaining member. Since the first lip 13 is in contact with the plunger 70, the above described pressure produces a contact force between the first lip 13 and plunger 70. This contact force produces frictional forces in the axial direction as the plunger 70 reciprocates axially. The frictional forces pull or compress the first lip 13, and thus may generate excessive stress in the flexible member near the inside corner 11a of the first retaining member. Also, deformation of the first flexible member 12 resulting from swelling caused by the sealed fluid may generate excessive stress in the flexible member near the inside corner 11a of the first retaining member.

The following configuration has been adopted to reduce the stress acting on the flexible member near the inside corner 11a of the first retaining member.

The gap (radial clearance) between the innermost diameter of the first retaining member 11 of the first oil seal 10 and the outside diameter of the plunger 70 is set to 0.9 mm or less because this will suppress the deformation of the first lip and thus reduce the stress generated in the flexible member near the inside corner 11a of the first retaining member when pressure is applied to the first oil seal 10 (first lip 13). FIG. 10 shows the stress generated in the first flexible member near the inside corner 11a of the first retaining member when a fuel pressure of 0.5 MPa is applied to the first oil seal (first lip). The horizontal axis represents the gap ($\phi D - \phi d$)/2 between the inside diameter of the first retaining member 11 and the outside diameter of the plunger 70, where $\phi D$ is the inside diameter of the first retaining member and $\phi d$ is the outside diameter of the plunger, and the vertical axis represents the stress in the first flexible member. With conventional oil seals, the value of ($\phi D - \phi d$)/2 is 0.9 mm. In that case, the stress in the first flexible member was 0.7 MPa. Using this radial clearance, a life test was conducted by applying pressure on the first lip. The safety factor was 1, which means that there is no margin over prescribed life. As a remedial measure, analysis was conducted using a radial clearance ($\phi D - \phi d$)/2 of 0.5 mm. The stress in the first flexible member generated near the inside corner 11a of the first retaining member was reduced to 0.3 MPa. Thus, it was found that the stress in the first flexible member generated near the inside corner 11a of the first retaining member depends heavily on the radial clearance ($\phi D - \phi d$)/2 between the inside diameter of the first retaining member 11 and the outside diameter of the plunger 70. Also with this radial clearance, a life test was conducted by applying pressure on the first lip. The safety factor over prescribed life was 2, which confirmed large reduction in the stress.

The inside corner 11a of the first retaining member subjected to the above described stress has a curved surface with a radius of curvature equal to or larger than 0.1. This shape serves to prevent excessive stress by dispersing the stress in the first flexible member concentrated on the neighborhood of the inside corner 11a of the first retaining member. It was also found through analysis and testing that this shape evidently reduces the stress acting on the inside corner 11a of the first retaining member.

A material—for example, fluorine-based rubber—with a swelling rate of 30% or less with respect to the sealed fluid is used for the first flexible member 12 to prevent swelling due to the sealed fluid. Otherwise, the volume of the first flexible member 12 will increase due to swelling while the volume of the first retaining member 11 remains unchanged, and consequently excessive stress will be generated in the first flexible member, especially near the inside corner 11a of the first retaining member. It is also possible to prevent swelling that causes stress by subjecting the surfaces of the first flexible member 12 to surface treatment resistant to penetration of the sealed fluid. The swelling rate is one of the factors that should be lowered not only to reduce the stress, but also to retain the shape of the lip that performs the original sealing function of the oil seal.

Also, a low-friction material is used for the first flexible member 12 to reduce the frictional forces between the first flexible member 12 and plunger. Instead of using a low-friction material, it is also possible to apply a friction-reducing surface treatment to the first flexible member 12 or plunger 70. Thus, by reducing the frictional forces, it is possible to lessen the axial tensile and compression loads acting on the first lip and ease the stress on the first flexible member 12 near the inside corner 11a of the first retaining member. Besides, the reduced frictional forces will also result in a reduction in the wear of the first lip and plunger.

Figure 5:
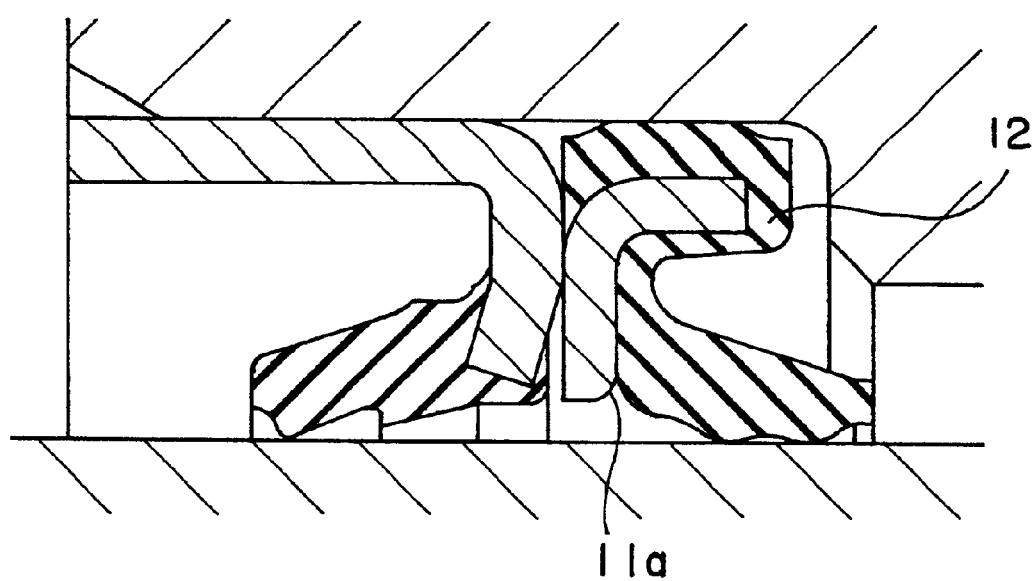
FIG. 5 is a partial sectional view of the oil seal according to a third embodiment of the present invention.

FIG. 5 shows the region near the inside corner 11a of the first retaining member subjected to the excessive stress, but the first flexible member has been removed from this region. By eliminating the contact between the first flexible member 12 and the inside corner 11a of the first retaining member, it is possible to prevent the stress produced in the first flexible member 12 from acting on the inside corner 11a of the first retaining member and thus improve pressure tightness.

Splitting the oil seal into two parts is advantageous when sealing out two-part fluid as is the case with this high pressure fuel pump in that materials suitable for the sealed fluids can be selected for the flexible members. For example, a highly rigid, fuel-resistant material can be used for the first flexible member, which is subjected to fuel pressure, and a moderately rigid, oil-resistant material can be used for the second flexible member, which is subjected to pressure more or less equivalent to atmospheric pressure. This increases design freedom. The distance between the first lip 13 and second lip 23 can be varied easily by changing the axial mounting positions of the first oil seal 10 and second oil seal 20. This increases the design freedom to change the travel distance of the reciprocating plunger 70.

FIG. 6 shows a oil seal consisting of a single piece by integrating the functions of a first oil seal and second oil seal. The outer portion of the oil seal combines a flexible member 17 and retaining member 25, sealing the junction between the oil seal and cylinder 60 and securing the oil seal to the cylinder 60 firmly. A first lip and second lip are formed around the retaining member 25. The opening of the retaining member faces the opening of the cylinder fitting hole 64 for size reduction, but there is no harm in reversing its direction.

FIG. 7 shows the retaining member with multiple holes 25a made in it to ease the manufacture of the oil seal shown in FIG. 6. More particularly, multiple holes are made in the retaining member to facilitate the flow of the flexible member in molding and vulcanizing the flexible member from one side, i.e., from the side of a lip 18 when molding the flexible member in one piece with the retaining member during the manufacture of the oil seal.

It is also possible to mold and vulcanize from both the sides of lips 18 and 26 without using the holes.

The present invention allows pressure to be applied to the oil seal in the fuel system of an in-cylinder direct injection engine, making it possible to eliminate the return passage that connects the high pressure fuel pump with the fuel tank. This in turn makes it possible to simplify the fuel system and increase the pressure proof of the oil seal.

What is claimed is:

1. A seal mechanism, comprising a retaining member having a cylindrical portion configured for mounting the seal mechanism on a body and an annular surface portion for receiving pressure of a pressurized fluid by cooperation with a sealing member, the annular surface portion having an inner periphery facing a sealing surface spaced therefrom with a gap at an innermost peripheral portion thereof, and a flexible member molded in one piece with the retaining member and having a flexible tip to perform a sealing function such that under the pressure of the pressurized fluid the flexible member is pushed against a pressurized-fluid side surface of the annular surface portion including an edge portion of the retaining member, wherein the retaining member is provided with a stress reduction mechanism only in a corner thereof; for reducing the stress generated in said flexible member the corner having a predetermined radius and being located within said flexible member at a side thereof to which the pressure of the pressurized fluid is applied to the sealing member, and the edge portion is formed at a side subjected to a lower pressure than the pressure side.

2. The seal mechanism according to claim 1, wherein said stress reduction mechanism is constructed such that the gap between the innermost diameter of said retaining member and the outside diameter of a shaft mounted in said flexible member and sliding freely along the flexible member is set to 0.9 mm or less.

3. The seal mechanism according to claim 2, wherein a plurality of seal mechanisms each having a retaining member and flexible member are used.

4. The seal mechanism according to claim 2, wherein the retaining member has a plurality of through-holes.

5. The seal mechanism according to claim 1, wherein said stress reduction mechanism is constructed such that the corner of said retaining member has a curved surface with a radius of curvature equal to or larger than 0.1 mm.

6. The seal mechanism according to claim 1, wherein said stress reduction mechanism is constructed such that a material with a swelling rate of 30% or less with respect to the sealed fluid is used for said flexible member which is in contact with the corner of said retaining member.

7. The seal mechanism according to claim 1, wherein said stress reduction mechanism is constructed such that said flexible member has been removed from the corner of said retaining member.

8. The seal mechanism according to claim 1, wherein said stress reduction mechanism is constructed such that said flexible member which contacts the sealed fluid is made resistant to penetration of the sealed fluid by surface modification or a coating.

9. The seal mechanism according to claim 1, wherein said stress reduction mechanism is constructed such that the surface which slides over said sealing surface is made of a low-friction material, or has undergone surface modification, or is covered with a coating.

10. A high pressure fuel pump comprising a reciprocating plunger, and a cylinder which is slip-fitted with the plunger and in which a variable-volume pressurizing chamber is formed with the reciprocating motion of said plunger, wherein said fuel pump is provided with a seal mechanism at a periphery of the plunger at which the seal mechanism seals two fluids of a pressurized fuel and a lubricant oil of lower pressure than the pressurized fuel mutually at a sealing surface of the plunger, the seal mechanism comprising a retaining member having a pressurized fuel sealing portion and a lubricant oil sealing portion, with a common space of the fuel and oil provided between the sealing portions, a sealing member molded with the retaining member and pushable against a sealing surface by a pressure of the pressurized fuel being provided at a pressure-receiving side edge portion of the retaining member in the pressurized fuel sealing portion, and the pressure-receiving side edge portion of the inner peripheral portion facing the sealing surface of the pressurized-fuel sealing portion has a surface configured as a stress reduction mechanism to relieve a contact stress with the sealing member in which a curved portion of the surface is formed at only a corner at a side exposed to the pressurized fuel to reduce contact stress of the retaining member and an edge portion is formed in the corner at a side exposed to the lubricant oil.

11. The high pressure fuel pump according to claim 10, wherein said stress reduction mechanism is constructed such that the gap between the innermost diameter of said retaining member and the outside diameter of a shaft mounted in said sealing member and sliding freely along the sealing member is set to 0.9 mm or less.

12. The high pressure fuel pump according to claim 10, wherein said stress reduction mechanism is constructed such that the corner of said retaining member has a curved surface with a radius of curvature equal to or larger than 0.1 mm.

13. The high pressure fuel pump according to claim 10, wherein said stress reduction mechanism is constructed such that a material with a swelling rate of 30% or less with respect to the sealed fluid is used for said sealing member which is in contact with the corner of said retaining member.

14. The high pressure fuel pump according to claim 10, wherein said stress reduction mechanism is constructed such that said sealing member has been removed from the corner of said retaining member.

15. The high pressure fuel pump according to claim 10, wherein said stress reduction mechanism is constructed such that said sealing member which contacts the sealed fluid is made resistant to penetration of the sealed fluid by surface modification or a coating.

16. The high pressure fuel pump according to claim 10, wherein said stress reduction mechanism is constructed such that the surface which slides over said sealing surface is made of a low-friction material, or has undergone surface modification, or is covered with a coating.

17. The high pressure fuel pump according to claim 16, wherein a plurality of seal mechanisms each having a retaining member and sealing member are used.

18. The high pressure fuel pump according to claim 16, wherein the retaining member has a plurality of through-holes.

* * * * *